United States Patent [19]

Lalancette

[11] 4,289,736
[45] Sep. 15, 1981

[54] FILTERING OF PRECIPITATING SILICA

[75] Inventor: Jean M. Lalancette, Sherbrooke, Canada

[73] Assignee: Universite de Sherbrooke, Quebec, Canada

[21] Appl. No.: 71,175

[22] Filed: Aug. 31, 1979

[30] Foreign Application Priority Data

Oct. 18, 1978 [CA] Canada .................................. 313713

[51] Int. Cl.³ .......................... C01F 5/00; C01F 5/30; C01F 5/38; C01F 5/40
[52] U.S. Cl. .................................... 423/158; 210/714; 210/778; 423/162; 423/163; 423/166; 423/167; 423/395; 423/497; 423/554
[58] Field of Search ............... 423/155, 158, 167, 163, 423/166, 338, 162; 210/46, 75, 714, 778

[56] References Cited

U.S. PATENT DOCUMENTS

| | | | |
|---|---|---|---|
| 1,340,535 | 5/1920 | Garcin | 423/167 |
| 2,402,370 | 6/1946 | Chalmers | 423/167 |
| 3,320,029 | 5/1967 | Adams | 423/159 |
| 3,338,667 | 8/1967 | Pundsack | 423/162 |
| 4,058,587 | 11/1977 | Nelson | 423/159 |

FOREIGN PATENT DOCUMENTS 1034385  7/1978  Canada .

Primary Examiner—O. R. Vertiz
Assistant Examiner—Wayne A. Langel
Attorney, Agent, or Firm—Cushman, Darby & Cushman

[57] ABSTRACT

The addition of an excess of asbestos tailings in the course of the extraction of magnesium from asbestos tailings by digestion with an acid greatly facilitates the elimination of silica and other impurities by filtration of the resulting reaction mixture. The improvement reduces the filtration time and the filtration leaves a cake which is much easier to dispose.

7 Claims, No Drawings

FILTERING OF PRECIPITATING SILICA

The present invention relates to an improved process for removing silica from aqueous solutions of magnesium salts obtained from asbestos tailings containing magnesium silicate.

PRIOR ART

The asbestos wastes or tailings derived from serpentine after recovery of asbestos fibres contain between 20 to 22% by weight of magnesium in the form of hydrated magnesium silicate ($3MgO.2SiO_2.2H_2O$) along with impurities such as calcium oxide, aluminum oxide, iron oxides (either ferrous or ferric) and traces of nickel and chrome. Furthermore, since a large part of these tailings are in finely divided form they can become a most interesting source of magnesium.

One approach to recover magnesium from asbestos tilings is to attack the latter with a mineral acid thereby forming the corresponding water-soluble salt of magnesium which must then be separated from the insoluble silica as can be seen from the following equation:

$$3MgO.2SiO_2.2H_2O + 3H_2 \rightarrow 3MgX + 2SiO_2 \downarrow + 5H_2O$$

where X is an anion of a mineral acid such as $SO_4^=$, $2Cl^-$, $2NO_3^-$.

From the existing literature it can be noted that a fairly large number of acids have been used to extract magnesium from asbestos tailings. For example references are typical: leaching with sulfuric acid ($H_2SO_4$): H. B. Chalmers, U.S. Pat. No. 2,402,370; leaching with bisulfite ($HSO_4^-$): F. L. Pundsack, U.S. Pat. No. 3,338,667; leaching with sulfur dioxide ($SO_2-H_2O$): A. W. Winston et al, U.S. Pat. No. 1,865,224; leaching with hydrochloric acid (HCl): J. Marek et al, Canadian Pat. No. 1,034,385; leaching with carbonic acid ($CO_2-H_2O$): M. F. Adams, U.S. Pat. No. 3,320,029 and E. W. Nelson, U.S. Pat. No. 4,058,587.

In all these processes, in order to obtain the magnesium salt it is essential to filter off the silica which is liberated by the action of the acid on the asbestos tailings from the solution of the magnesium salt. It is well known that the filtration of precipitated silica is very difficult since such a precipitate is in the form of a gel which tends to plug the filter, causes a slow rate of filtration and an important retention of the solution of the useful magnesium salt.

Accordingly, it is very desirable to provide a process for recovering water-soluble magnesium salts from asbestos tailings which overcomes the drawbacks caused by the necessity of eliminating insoluble metallic salts and the presence of silica during the filtration step.

THE INVENTION

In accordance with the present invention, there is provided an improvement whereby a solution of magnesium salts containing silica and other insoluble metal salt impurities can be readily filtered to recover the magnesium salt in a time of from 2 to 10 times faster than heretofore known.

In the improvement of the present invention, it has unexpectedly been found that the time factor required for filtering the reaction mixture of a slurry of asbestos tailings with a mineral acid to form an aqueous reaction medium containing water-soluble salts of magnesium, silica gel and insoluble metal salts can be substantially reduced by adding to said reaction medium a further quantity of asbestos tailings in an amount exceeding the stoichiometric amount required for the reaction of the initial magnesium oxide contained in the initial asbestos tailings and the mineral acid.

It has therefore been surprisingly found that the addition of an excess of asbestos tailings to the reaction mixture greatly facilitates the filtration of the precipitated silica in forming a mat on the membrane of the filter that is fairly permeable to the solution and much more efficient in retaining the silica and other insoluble material present, such as iron oxide, without clogging, thus giving a good and constant filtration rate of the order of 6.5 gal. per square foot. When an excess of asbestos tailings is present at the filtration, the cake which is formed on the filter is also easier to handle and to dispose of than the gelatinous silica gel cake.

Without going into lengthy considerations, it is believed that the particular structure of the tailings contributes to a large extent to the improved filtrability of the reaction mixture after an addition of excess material. A preferred but not exclusive embodiment of this invention calls for the addition of the excess of tailings, or part of the excess, when the initial digestion of the tailings by the acid has been completed. Such an approach preserves the structure of the material in excess and gives an increased assistance for the filtration.

The amount of tailings added in excess can vary from 5% of the initial charge to about 200% of the reacted material with the acid available. Since the commercial value of the asbestos tailings is minimal, this addition does not affect the cost of the operation in a significant way. But the improvement of the rate of filtration by a factor of two to ten and the resulting ease of the operation do improve the profitability of the extractive operation by allowing a much faster rate of production.

The nature of the acid used for the leaching is indifferent to the observed effects of excess of tailings on filtration since the improved filtrability is related to the presence of an excess of waste in the presence of the precipitated silica rather than the presence of a given anion, sulfate, chloride, etc., associated with the magnesium in solution.

The evaluation of the assistance of an excess of asbestos tailings in the course of the filtration of the precipitated silica has been done under two sets of conditions: filtration by gravity and filtration under a differential of pressure. In each case, a noted improvement of the rate of filtration has been noted. Particularly with filtration under a differential of pressure, the effect has been important, as shown by the following examples.

EXAMPLES 1-4

Filtration by gravity of the reaction mixture when the excess of waste was added at the onset of the reaction.

A slurry of 100 ml of HCl 37%, 73 g of asbestos tailings (−200 mesh) and 51 ml of water was heated at 100° C. for twelve hours, under reflux and mechanical stirring. The reaction mixture was then filtered by gravity in a constant level filter with a membrane made of paper (Whatman 2 V) diam. 10 cm, the fluid head being kept constant at 4 cm. The volume of filtrate was noted after 30 minutes.

The example was then repeated using increasing excess of asbestos tailings. The percentage of suspended solid was kept constant at 30% in these Examples by adjustment of the added volume of water. The speeds of filtration are reported in Table I.

TABLE I

| | | | | | | |
|---|---|---|---|---|---|---|
| | Filtration by gravity with excess at the onset of the reaction | | | | | |
| | Residues | | Acid | | Excess of tailing over stoichiometry: | Water added | Volume of Filtrate after 30 min. |
| Ex. No. | Weight (g) | Mole (Mg) | Mole (HCl) | Volume (ml) | % residue over acid | (ml) | (ml) |
| 1 | 73 | 0.63 | 1.20 | 100 | 5 | 51 | 21.4 |
| 2 | 109.5 | 0.95 | 1.20 | 100 | 58 | 137 | 26.7 |
| 3 | 146 | 1.26 | 1.20 | 100 | 110 | 222 | 56.2 |
| 4 | 219 | 1.89 | 1.20 | 100 | 215 | 392 | 71.6 |

EXAMPLES 5-7

Filtration by gravity of the reaction mixture when the excess of waste was added at the end of the reaction.

A suspension of 100 g of asbestos tailings (mesh −200) in 144 ml of HCl and 62 ml of $H_2O$ was heated at 95°-100° C., under reflux, with good stirring, for twelve hours. The initial slurry was 30% solid (weight over weight) and contained 105% of the theoretical amount required to react with the magnesium present.

After this contact, a weighted sample of asbestos tailings was added in one portion and the contact was maintained at 100° C. for another period of two hours. With the addition of waste, water was also added in order to maintain the slurry at a 30% (w/w) in solid in suspension, thus giving comparable suspensions in terms of solids to be filtrated. The filtration was done as in Example 1.

The complete example was repeated with different excess of residues and the results are reported in Table II.

TABLE II

| | | | | | | | | |
|---|---|---|---|---|---|---|---|---|
| | Filtration by gravity with excess added at the end of the reaction | | | | | | | |
| | Initial weight of residues | | Acid | | Added weight of residues | | Excess of tailing over stoichiometry: | Water added with excess | Volume of filtrate after 30 min. |
| Ex No | Weight (g) | Mole (Mg) | Mole (HCl) | Volume (ml) | Weight (g) | Mole (mg) | total residues over acid (%) | residues (ml) | (ml) |
| 5 | 100 | 0.86 | 1.81 | 144 | 58 | 0.50 | 50 | 136 | 28.1 |
| 6 | 100 | 0.86 | 1.81 | 144 | 111 | 0.96 | 101 | 259 | 30.8 |
| 7 | 100 | 0.86 | 1.81 | 144 | 216 | 1.87 | 201 | 504 | 59.4 |

EXAMPLES 8-14

Filtration under vacuum

In this series of examples, a given weight of residues (mesh −200) was digested with hydrochloric acid and water at 100° C. for twelve hours, the initial slurry being fixed at 30% solid (w/w). In some examples, a measured excess of wastes was added at the end of the twelve hour reflux and heated at 100° C. for a further two hours. In other cases, the excess was present at the beginning of the reaction. Also, in some cases, an excess of acid rather than an excess of residues was used.

The filtration was done by vacuum (5 cm Hg) using a Buchner funnel (diam. 10 cm) and a Whatman 2 V filter paper. The liquid was collected in a graduated flask and measured against time. Results are reported in Table III.

TABLE III

| | | | | | | | | |
|---|---|---|---|---|---|---|---|---|
| | Filtration under vacuum | | | | | | | |
| | Initial weight of residues | | Acid | | Added weight of residues after 12 hrs. | | Excess of tailing over stoichiometry: | Time required to filtrate 100 ml |
| Ex. No. | Weight (g) | Mole (Mg) | Mole (HCl) | Volume (ml) | Weight (g) | Mole (Mg) | Total residues over acid (%) | (sec) |
| 8 | 100 | 0.86 | 1.84 | 144 | 0 | 0 | −7 (excess acid) | 1280 |
| 9 | 100 | 0.86 | 1.72 | 135 | 0 | 0 | 0 | 1174 |
| 10 | 100 | 0.86 | 1.72 | 135 | 5 | 0.04 | 5 | 510 |
| 11 | 200 | 1.73 | 1.65 | 137 | 0 | 0 | 100 | 91 |
| 12 | 120 | 1.04 | 1.72 | 135 | 0 | 0 | 20 | 196 |
| 13 | 100 | 0.86 | 1.65 | 137 | 100 | 0.86 | 100 | 45 |
| 14 | 100 | 0.86 | 1.65 | 137 | 10 | 0.09 | 15 | 224 |

EXAMPLES 15-18

Digestion by $HNO_3$ and $H_2SO_4$

In order to evaluate the effect of the acid on the speed of filtration, the Examples No. 8 and No. 14 have been repeated as Examples 15 and 16 using the same technique as described in Example 8 except that the acid reagent was sulfuric acid in Examples 15 and 17 or nitric acid in Examples 16 and 18. From the results reported in Table IV, it can be noted that these substitutions gave essentially equivalent speeds of filtration.

TABLE IV

| | | | | |
|---|---|---|---|---|
| | Digestion with $H_2SO_4$ or $HNO_3$ | | | |
| Ex. No. | Acid used | | | Time required to filtrate 100 ml |
| | Acid | Mole | Volume | (sec.) |
| 15 | $H_2SO_4$ | 0.92 | 145 | 1298 |
| 16 | $HNO_3$ | 1.84 | 144 | 1276 |
| 17 | $H_2SO_4$ | 0.83 | 137 | 215 |

TABLE IV-continued

| | Digestion with $H_2SO_4$ or $HNO_3$ | | | |
|---|---|---|---|---|
| Ex. No. | Acid used | | | Time required to filtrate 100 ml (sec.) |
| | Acid | Mole | Volume | |
| 18 | $HNO_3$ | 1.65 | 137 | 231 |

EXAMPLES 19-20

Effect of dilution

Examples 8 and 12 were repeated as described except that the volume of the initial solution was increased, thus giving a slurry of 22% in the case of Example 19 and 27% in the case of Example 20. The time of filtration is reported in Table V.

TABLE V

| | | Effect of dilution | | |
|---|---|---|---|---|
| Ex. No. | Residues (g) | Acid (ml) | Water added (ml) | Slurry % solid w/w (%) | Time required to filtrate 100 ml (sec.) |
| 19 | 100 | 145 | 300 | 22 | 918 |
| 20 | 120 | 135 | 310 | 27 | 137 |

I claim:

1. A process for recovering a water-soluble magnesium salt from a reaction mixture containing a water-soluble magnesium salt, silica, and metal salt impurities comprising reacting the magnesium oxide of an aqueous slurry of asbestos tailings with a mineral acid, there being employed sufficient asbestos tailings that the reaction mixture contains at least 5 percent by weight of asbestos tailings in excess of the stoichiometric amount required for the reaction of the magnesium oxide contained in the asbestos tailings with the mineral acid said excess asbestos tailings being present and recovering the magnesium salt in solution by filtration to eliminate silica and metal salt impurities, the excess asbestos tailings in the reaction mixture facilitating the filtration of the precipitated silica in forming a mat on the membrane of the filter, the mat being permeable to the solution and retaining the silica and metal salt impurities.

2. The process of claim 1, wherein the excess of asbestos tailings is from 5 to 200% by weight of the stoichiometric amount of asbestos tailings required for the reaction of the magnesium oxide in the tailings with the mineral acid.

3. The process of claim 2, wherein the excess of asbestos tailings is added to the stoichiometric amount of asbestos tailings before the reaction with the mineral acid.

4. The process of claim 2, wherein the excess of asbestos tailings is added to the reaction medium after the reaction and before effecting filtration thereof.

5. A process according to claim 1 wherein the excess of tailings over stoichiometry based on the molar ratio of mineral acid to Mg content of the tailings is from 5 to 215% by weight.

6. A process according to claim 5 wherein the mineral acid is hydrochloric acid and the stoichiometric molar ratio of hydrochloric acid to Mg is 2:1.

7. The process of claim 1 wherein the mineral acid is hydrochloric acid.

* * * * *